(12) United States Patent
Green

(10) Patent No.: US 7,963,543 B2
(45) Date of Patent: Jun. 21, 2011

(54) TRAILER HITCH SAFETY ASSEMBLY

(76) Inventor: John Green, Chicago, IL (US)

( * ) Notice: Subject to any disclaimer, the term of this patent is extended or adjusted under 35 U.S.C. 154(b) by 0 days.

(21) Appl. No.: 11/746,940

(22) Filed: May 10, 2007

(65) Prior Publication Data

US 2008/0277902 A1    Nov. 13, 2008

(51) Int. Cl.
*B60D 1/28* (2006.01)
(52) U.S. Cl. .......... 280/457; 280/480; 280/432
(58) Field of Classification Search .......... 280/457, 280/433, 456.1
See application file for complete search history.

(56) References Cited

U.S. PATENT DOCUMENTS

| | | | |
|---|---|---|---|
| 3,125,355 A | 3/1964 | Snuggins | |
| 3,132,878 A | 5/1964 | DePuydt | |
| 3,827,722 A | 8/1974 | Miller | |
| 3,869,148 A | 3/1975 | Iehl | |
| 3,870,343 A | 3/1975 | McGahee | |
| 4,180,281 A * | 12/1979 | Tertinek | 280/457 |
| 5,215,325 A * | 6/1993 | Novotny et al. | 280/480.1 |
| 5,362,084 A * | 11/1994 | Edwards | 280/457 |
| 5,476,280 A * | 12/1995 | MacMullan | 280/480.1 |
| 5,566,965 A | 10/1996 | Applegate | |
| 5,788,258 A | 8/1998 | Gill | |
| 5,893,575 A * | 4/1999 | Larkin | 280/491.1 |
| 5,918,896 A | 7/1999 | Jenkins | |
| 5,967,539 A * | 10/1999 | Digman | 280/480.1 |
| 6,179,317 B1 * | 1/2001 | Hurst et al. | 280/457 |
| 6,279,939 B1 * | 8/2001 | Austin | 280/457 |
| 6,443,474 B1 * | 9/2002 | Kay | 280/457 |
| 2002/0017770 A1 * | 2/2002 | Parrish | 280/480.1 |
| 2005/0246974 A1 | 11/2005 | Anderson | 52/155 |

* cited by examiner

*Primary Examiner* — Joanne Silbermann
*Assistant Examiner* — Tashiana Adams
(74) *Attorney, Agent, or Firm* — Mark E. Wiemelt

(57) ABSTRACT

A fully adjustable safety chain assembly comprising at least one trailer mounted safety chain adjusting box, at least one vehicle mounted safety chain adjusting box, and a safety chain having a first free end and a second free end. A slot in each of the at least one trailer mounted safety chain adjusting box and at least one vehicle mounted safety chain adjusting box enables the safety chain first free end and second free end, respectively, to be reversible affixed at a selected position, thereby holding the safety chain at a desired length. A locking mechanism secures the safety chain in place to prevent it from dislodging.

13 Claims, 8 Drawing Sheets

TRAILER HITCH SAFETY ASSEMBLY

I. TECHNICAL FIELD

The present invention relates to safety chain assemblies and more specifically to an adjustable safety chain assembly having multiple adjustment points.

II. BACKGROUND OF THE INVENTION

Safety chains for adding security in attaching trailers to vehicles have been in use for many years and are required by law. The purpose of a safety chain is to prevent a trailer that breaks away from its hitch from completely separating from the vehicle to which it is attached and careening under its own power.

Over the years, many safety chain configurations have been offered. In general, the offerings have consisted of a linked chain permanently affixed at one end to a trailer and a second free end having a hook-up means for affixing to a vehicle in some fashion.

A general shortcoming of the prior art is that does not allow for multiple adjustment points. This causes situations in which the safety chain may hang low to the ground and scrape or prohibit the hook-up of certain trailers to certain tow vehicles. Oftentimes, therefore, users will take to devising sometimes elaborate hookup means such as twisting the safety chain around the trailer arm or crisscross the safety chain. These hookup variations are dangerous in that equipment used in an unintended way which can weaken the holding strength of the safety chain unit.

Another shortcoming is that the free end of the safety chain may fit only a certain style of safety hook-up, such as a special hook, e.g., an s-hook or a looking link.

The problem is particularly in moving heavy equipment where the need for a strong connection between the vehicle and the trailer is required and speed/flexibility is of utmost importance.

There is end, therefore for an adjustable safety chain assembly that offers multiple adjustment points, is useful in many hook-up environments, and is easy and fast to use. Such an assembly is provided for in the present invention.

III. OBJECTS OF THE INVENTION

It is an object of the present invention to provide a safety chain assembly which has multiple adjustment points.

It is a further object of the invention to provide a safety chain assembly which enables use of the assembly which a wide variety of trailer-vehicle combinations.

It is yet another object of the present invention to provide a safety chain assembly that is flexible and easy to use.

It is yet a further object of the present invention to provide a safety chain assembly that offers a secure and strong attachment between trailer and vehicle.

The above objects are provided for in the present invention.

IV. SUMMARY OF THE INVENTION

A fully adjustable safety chain assembly comprising at least one trailer mounted safety chain adjusting box, at least one vehicle mounted safety chain adjusting box, and a safety chain having a first free end and a second free end.

The trailer mounted safety chain adjusting box and the vehicle mounted safety Chain adjusting box can be any shape including but not limited to square, rectangular, generally half-moon round, generally half oval, and generally v-shaped. The trailer mounted safety adjusting box and vehicle mounted safety adjusting box further comprise an outer wall opposite the trailer frame or vehicle mounting surface, a first side wall, a second side wall, an at least partially open top, and an at least partially open bottom, the outer wall further including the means for accepting the safety chain first free end. The trailer mounted safety chain adjusting box and vehicle mounted safety chain adjusting box may further include a trailer-side wall or a vehicle-side wall, respectively. Additionally, the trailer mounted safety chain adjusting box and vehicle mounted safety chain adjusting box bottoms may be closed in order to hold excess chain. The bottoms, if closed may also include drain openings.

A slot in each of the at least one trailer mounted safety chain adjusting box and at least one vehicle mounted safety chain adjusting box enables the safety chain first free end and second free end, respectively, to be reversible affixed at a selected position, thereby holding the safety chain at a desired length. The slot may be open to the top, or contained within the wall and having a configuration which can accept the safety chain and secure it into position.

A locking mechanism secures the safety chain in place to prevent it from dislodging. The locking mechanism comprises slots in the trailer mounted safety chain adjusting box and vehicle mounted safety chain adjusting box side walls sized to accept a safety rod. The safety rod is put into and through one of the side wall holes and extended the interior length of the box and into and through the hole in the opposite side wall. The holes are located in the side walls such that the safety rod securely holds the safety chain in place until the safety rod is removed.

There has been outlined, rather broadly, the more important features of the invention in order that the detailed description thereof that follows may be better understood, and in order that the present contribution to the art may be better appreciated. There are, of course, additional features of the invention that will be described hereinafter and that will form the subject matter of the invention.

As such, those skilled in the art will appreciate that the conception, upon which this disclosure is based, may readily be utilized as a basis for designing of other structures, methods, and systems for carrying out the several purposes of the present invention. It is important, therefore, that the claims be regarded as including such equivalent constructions in so far as they do not depart from the spirit and scope of the present invention.

Further, the purpose of the abstract is to enable the US patent and trademark office and the public generally, and especially the scientists, engineers and practitioners in the art who are not familiar with the patent or legal terms or phraseology, to determine quickly from what cursory inspection the nature and essence of the technical disclosure of the application. The abstract is neither intended to define the invention of the application, which is measured by the claims, nor is it intended to be limiting as to the scope of the present invention in any way.

These together with other objects of the present invention, along with the various features of novelty which characterize the present invention, are pointed out with particularity in the claims annexed to and forming a part of this disclosure. For a better understanding of the present invention, its operating advantages and the specific objects attained by its uses, reference should be had to the accompanying drawings and descriptive matter in which there is illustrated a preferred embodiment of the present invention.

Before explaining the preferred embodiment of the present invention in detail, it is to be understood that the present invention is not limited in its application to the details of construction and to the arrangements of the components set forth in the following description or illustrated in the drawings. The present invention is capable of other embodiments and of being practiced and carried out in various ways. Also, it is to be understood that the phraseology and terminology employed herein are for the purpose of description and should not be regarded as limiting.

V. BRIEF DESCRIPTION OF THE DRAWINGS

Figure 7:
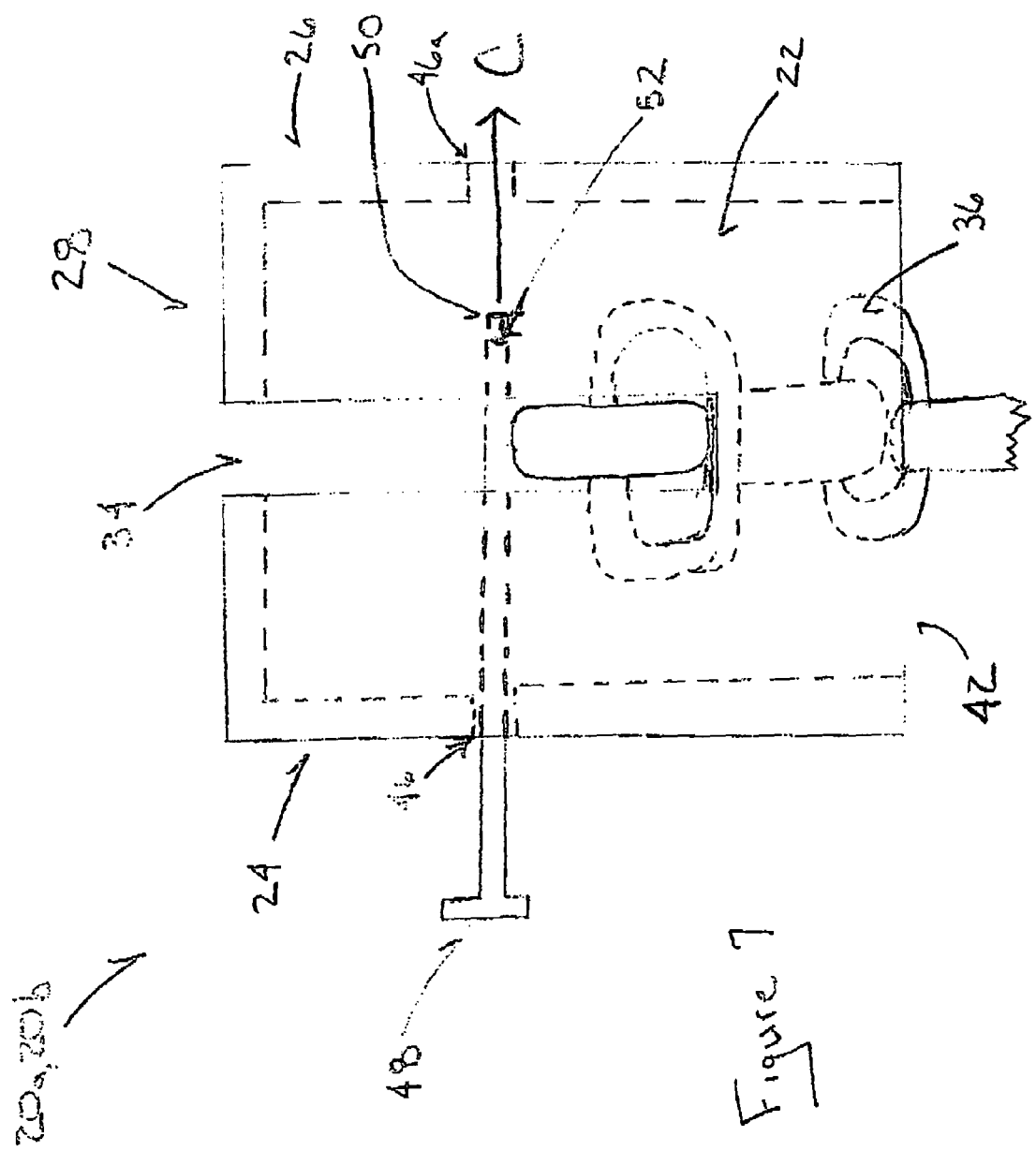
Figure 8:
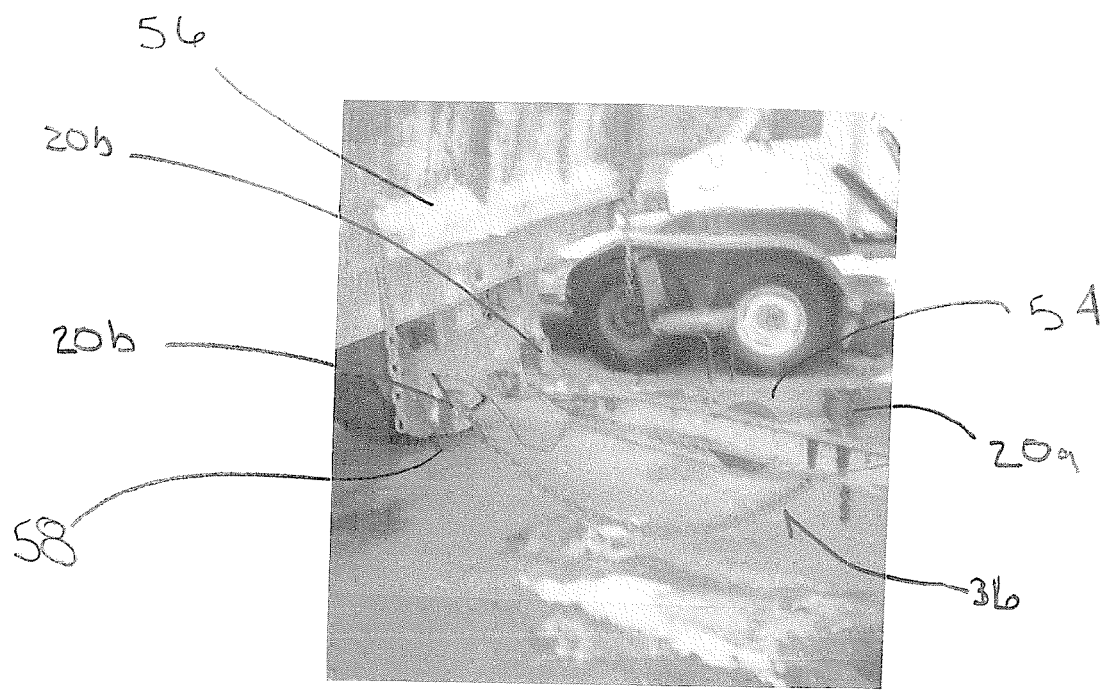

FIG. 7 depicts a safety rod being place into and through a cut away front view of a mounted safety chain adjusting box and vehicle mounted safety chain adjusting box FIG. 8 depicts the trailer mounted safety chain adjusting box and vehicle mounted safety chain adjusting box in the preferred embodiment affixed to a trailer and a vehicle and a safety chain inserted into the slot of the trailer mounted safety chain adjusting box and vehicle mounted safety chain adjusting box.

Figure 9:
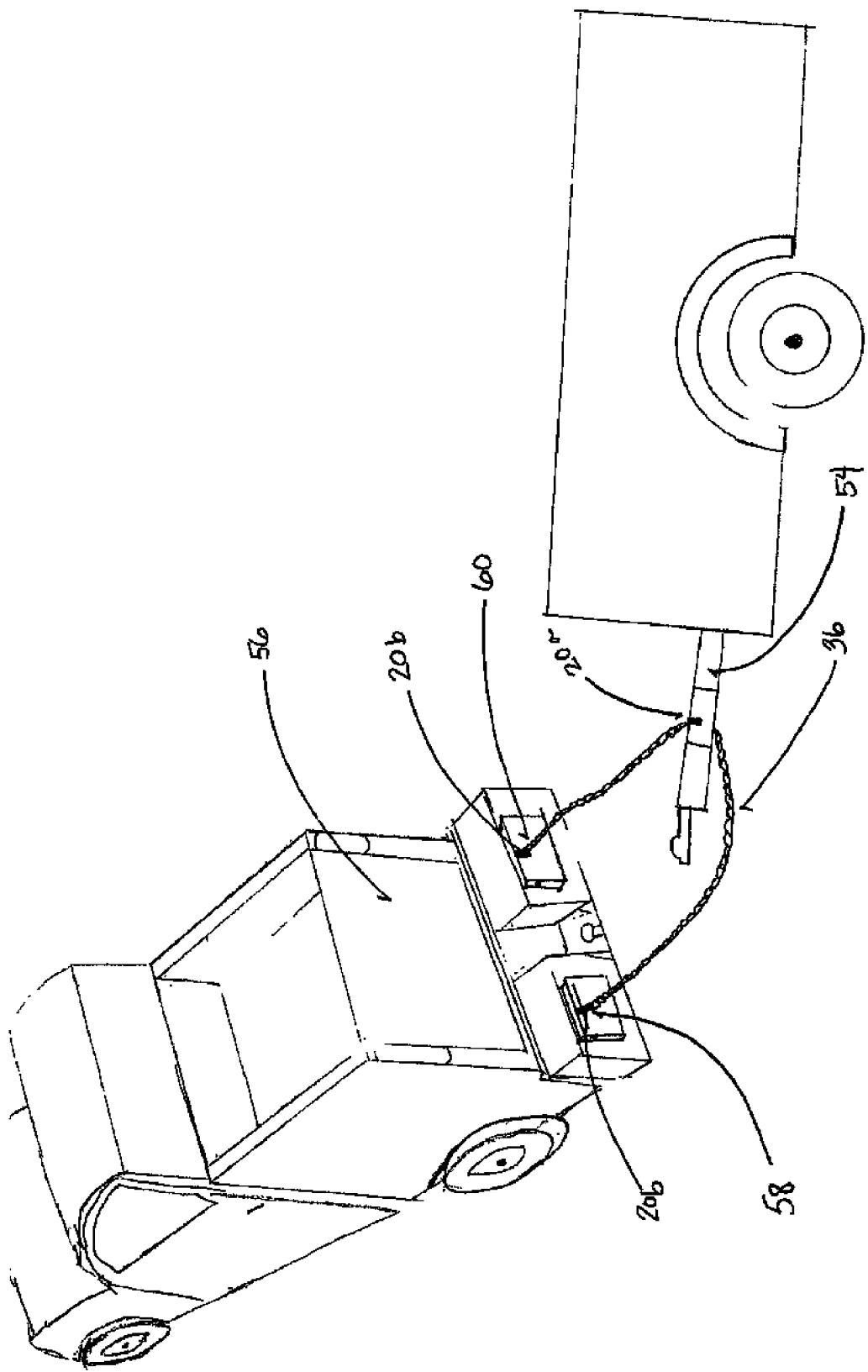

FIG. 9 depicts the trailer mounted safety chain adjusting box and vehicle mounted safety chain adjusting box in the preferred embodiment affixed to a trailer and a vehicle and a safety chain inserted into the slot of the trailer mounted safety chain adjusting box and vehicle mounted safety chain adjusting box wherein the trailer is separated from the vehicle.

VI. DETAILED DESCRIPTION

Before explaining the preferred embodiment of the present invention in detail, it is to be understood that the present invention is not limited in its application to the details of construction and to the arrangements of the components set forth in the following description or illustrated in the drawings. The present invention is capable of other embodiments and of being practiced and carried out in various ways. Also, it is to be understood that the phraseology and terminology employed herein are for the purpose of description and should not be regarded as limiting.

Figure 1:
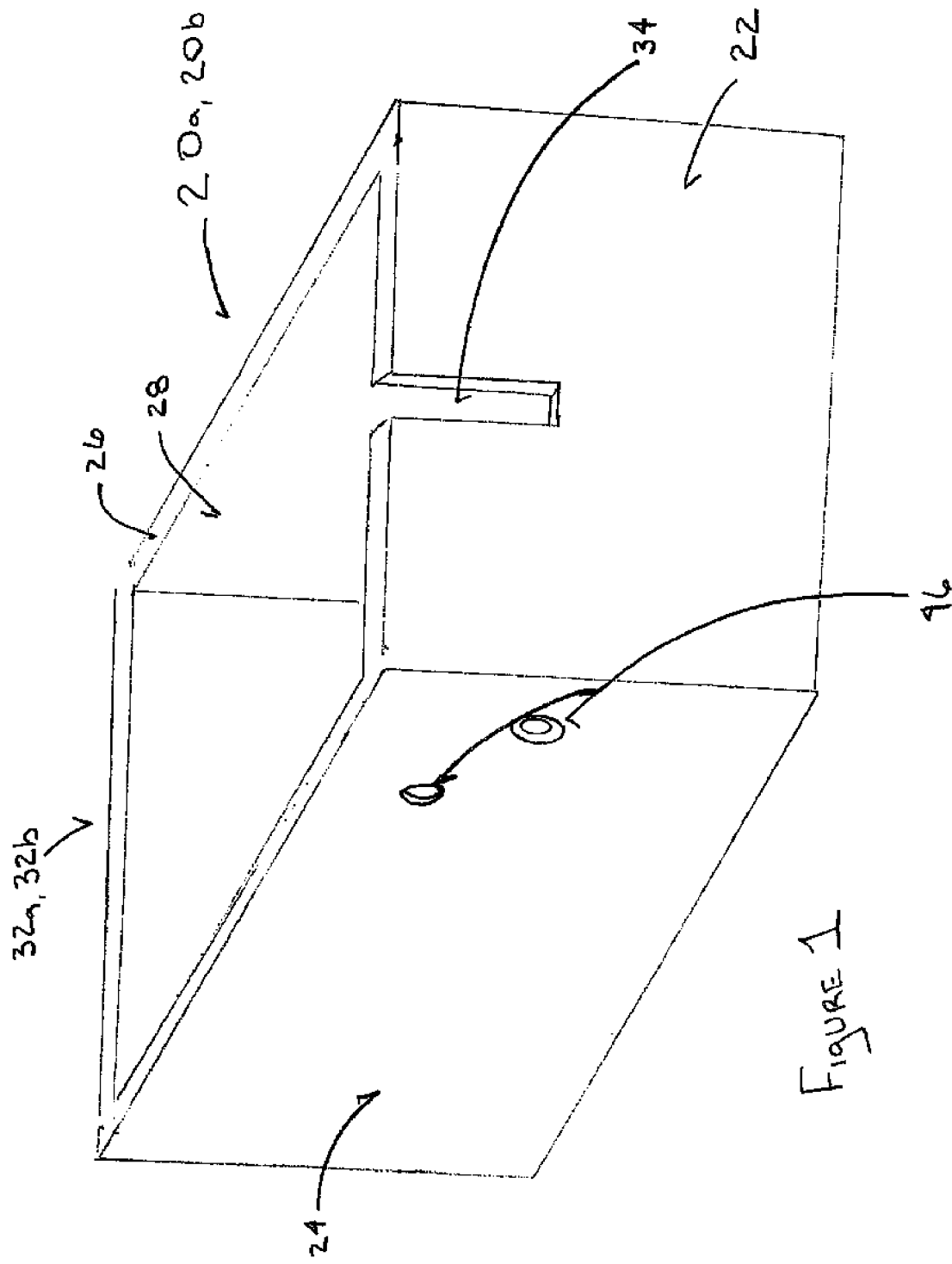
FIG. 1 depicts a perspective view of the preferred embodiment of the invention trailer mounted safety chain adjusting box and vehicle mounted safety chain adjusting box.

FIG. 1 depicts a perspective view of trailer mounted safety chain adjustment box 20a and/or a vehicle mounted safety chain adjustment box 20b. Throughout the Specification, reference to trailer mounted safety chain adjustment box also refers to a vehicle mounted safety chain adjustment box and visa versa unless otherwise noted. The two members are similar in construction and use. Although, and as described below, they each can have different configurations and a mixture of configurations can be used simultaneously.

Figure 2:
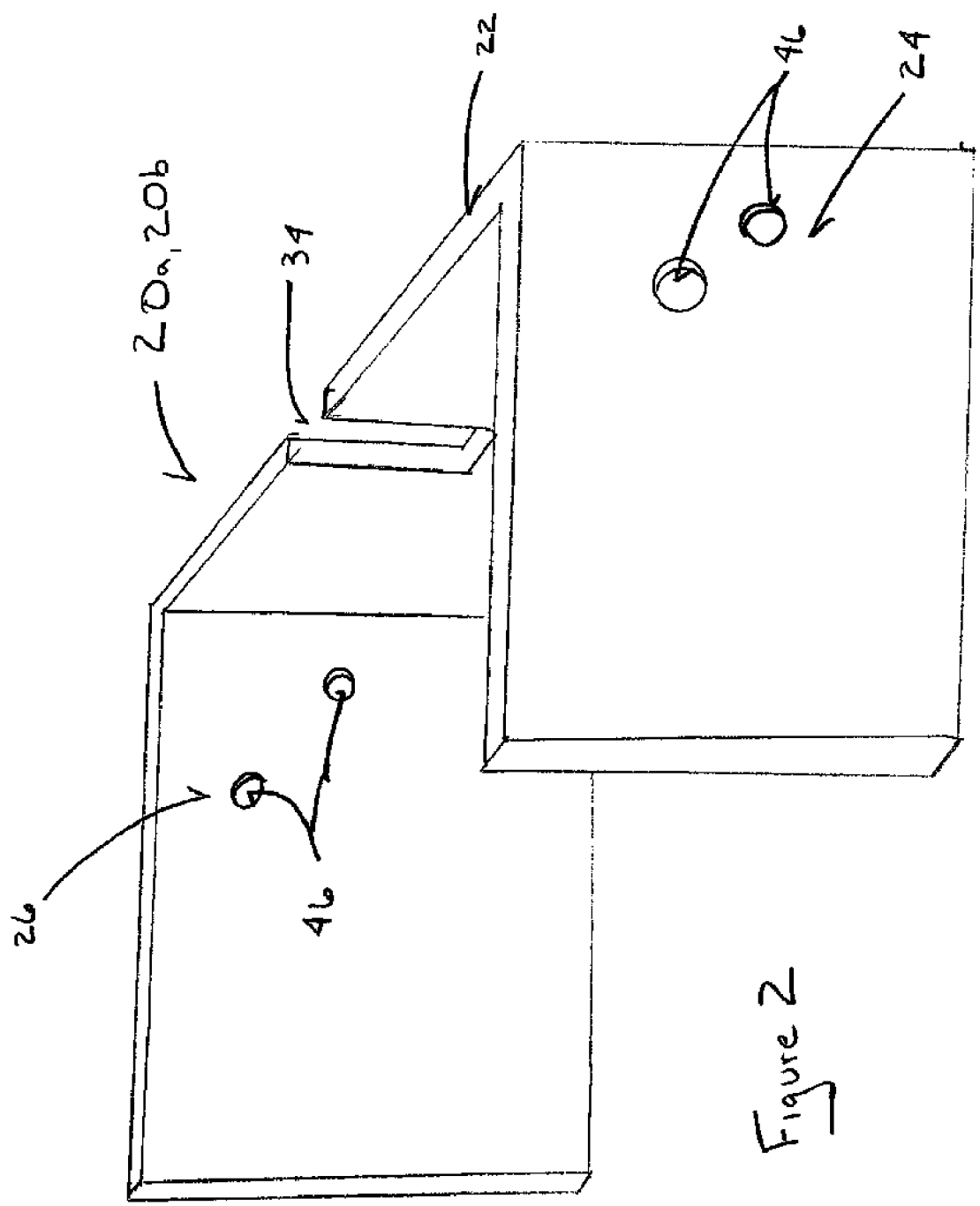
FIG. 2 depicts a perspective view of the invention trailer mounted safety chain adjusting box and vehicle mounted safety chain adjusting box without a trailer-side or vehicle-side wall.
Figure 3:
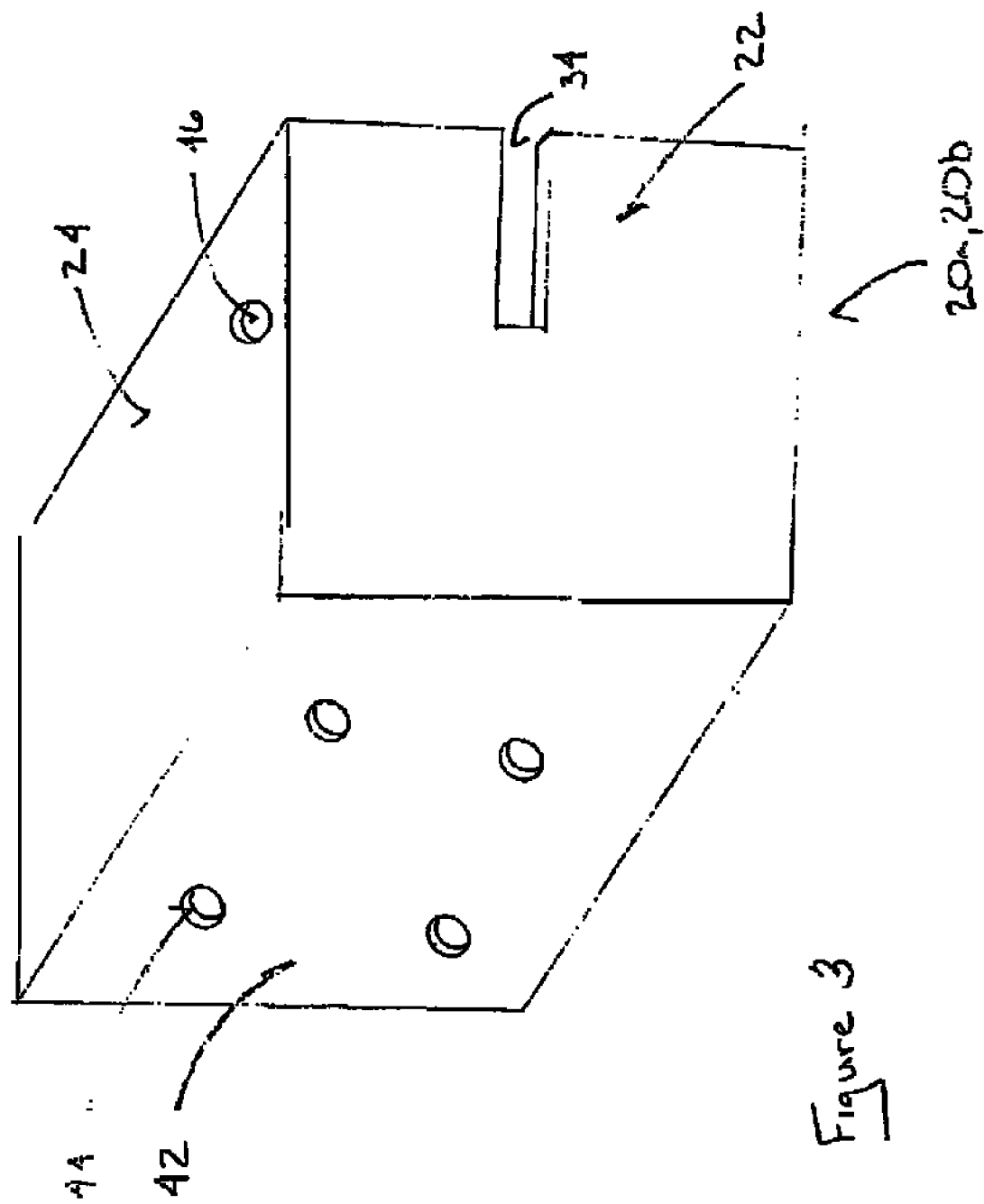
FIG. 3 depicts a perspective view of the present invention illustrating a bottom in the trailer mounted safety chain adjusting box and vehicle mounted safety chain adjusting box.

Trailer mounted safety chain adjustment box 20a and vehicle mounted safety chain adjustment box 20b further comprise an outer wall 22, a first side wall 24, a second side wall 26, an at least partially open top 28, and an at least partially open bottom 30 (not shown). In the preferred embodiment, trailer mounted safety chain adjustment box 20a and vehicle mounted safety chain adjustment box 20b further comprise a trailer-side wall 32a in the case of the trailer mounted safety chain adjustment box 20a and a vehicle-side wall 32b in the case of the vehicle mounted safety chain adjustment box 20b. However, and as depicted in FIG. 2, trailer-side wall 32a and vehicle-side wall 32b are not critical to the invention. The inventor has found that having a trailer-side wall 32a and vehicle-side wall 32b makes manufacturing and mounting of trailer mounted safety chain adjustment box 20a and vehicle mounted safety chain adjustment box 20b easier. However, having no trailer-side wall 32a and vehicle-side wall 32b does not alter the scope or spirit of the invention and does not alter its function.

Trailer mounted safety chain adjustment box 20a and vehicle mounted safety chain adjustment box 20b further include slot 34. Slot 34 is sized to accept safety chain 36 (FIG. 7). In the preferred embodiment, slot 34 (FIG. 7) is located in outer wall 22 and is open towards open top 28. Although slot 34 is, in the preferred embodiment, open towards top 28, alternate configurations are acceptable.

Trailer mounted safety chain adjustment box 20a and vehicle mounted safety chain adjustment box 20b can also include closed bottom 42. Closed bottom 42 may be used to gather and store excess chain. However, in the preferred embodiment there is no bottom as safety chain 36 may need to be threaded through open bottom 30. If a closed bottom 42 is employed, drain holes 44 may be needed to prevent water build up.

Figure 4:
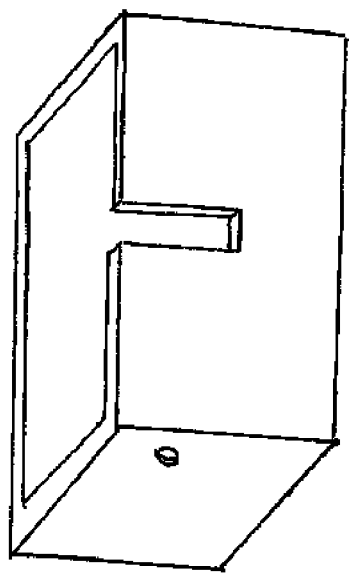
FIG. 4 depicts a perspective view of an alternate embodiment of the present invention in the shape of a rectangle.

Trailer mounted safety chain adjustment box 20a and vehicle mounted safety chain adjustment box 20b can be of any configuration and still remain within the scope and spirit of the invention. For non-limiting examples, see FIGS. 4, 5, and 6 wherein trailer-side wall 32a and vehicle-side wall 32b are depicted as a rectangle, half moon and v-shaped, respectively.

Figure 5:
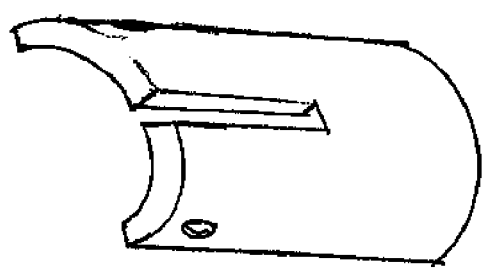
FIG. 5 depicts a perspective view of an alternate embodiment of the present invention in the shape of a half moon.
Figure 6:
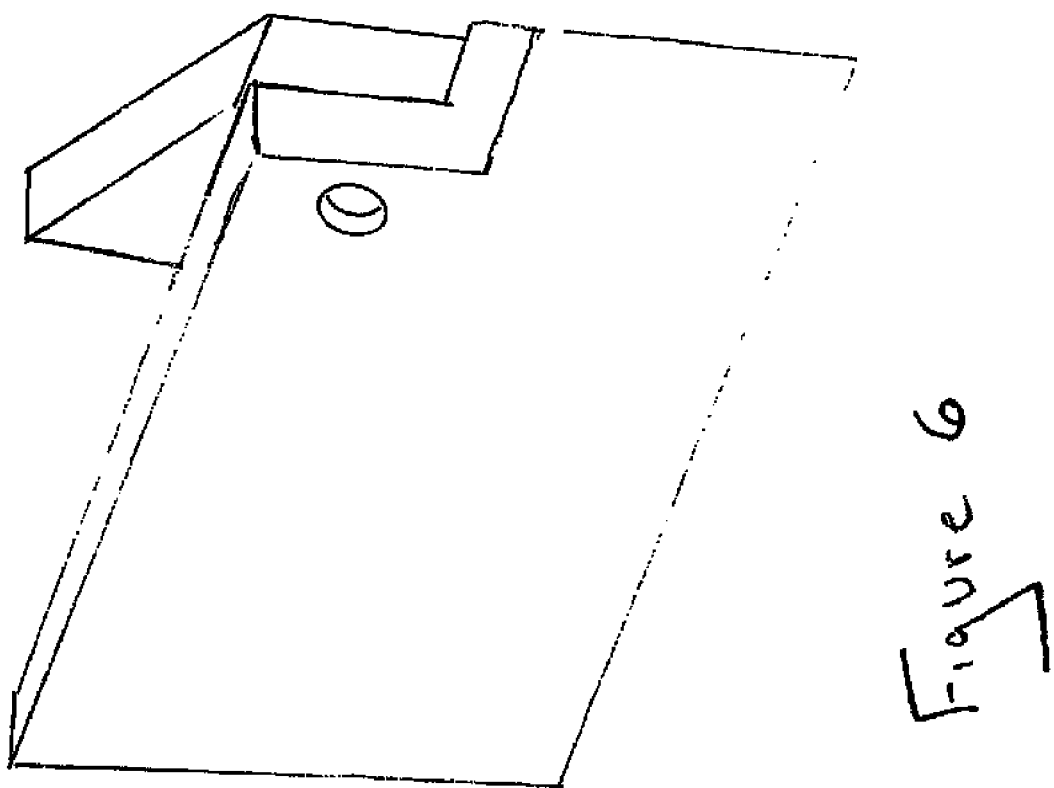
FIG. 6 depicts a perspective view of an alternate embodiment of the present invention in a V-shape.

Trailer mounted safety chain adjustment box 20a and vehicle mounted safety chain adjustment box 20b further include retention rod insertion holes 46 found in side wall 24 and 26. There may be multiple retention rod holes 46 as depicted in FIGS. 1 and 2 or there may just one retention rod hole in each of trailer mounted safety chain adjustment box 20a and vehicle mounted safety chain adjustment box 20b side wall 24 and 26 as depicted in FIGS. 3-7. Retention rod holes 46 are sized to receive retention rod 48. As depicted in FIG. 5, retention rod 48 first end 50 is put through retention rod hole 46 on side wall 24 and slid though the interior of trailer mounted safety chain adjustment box 20a and vehicle mounted safety chain adjustment box 20b on through retention rod hole 46a on the opposite side wall 26 along line C. Once in place, retention rod 48 may be secured by placing a locking device through locking hole 52.

Retention rod hole 46 are placed in side walls 24 and 26 so as to position retention rod 48 over safety chain 36, thus locking into slot 34 until retention pin 48 is removed.

In use, and as depicted in FIGS. 8 and 9, trailer mounted safety chain adjustment box 20a and vehicle mounted safety chain adjustment box 20b are mounted to trailer 54 and vehicle 56, respectively. Trailer mounted safety chain adjustment box 20a and vehicle mounted safety chain adjustment box 20b can be mounted in any conventional manner but are preferable welded on. In the preferred embodiment, there are two of each of trailer mounted safety chain adjustment box 20a and vehicle mounted safety chain adjustment box 20b, however it is possible to use one of each: one on the trailer and one on the vehicle. Once mounted, safety chain 36 first end 58 is placed into any one of the trailer mounted safety chain adjustment box 20a or vehicle mounted safety chain adjustment box 20b and locked into place using retention rod 48 as described above.

Safety chain second end 60 is then placed through the trailer mounted safety chain adjustment box 20a and vehicle mounted safety chain adjustment box 20b on the same side, adjusted to length and locked into position with retention rod 48 as described above. If using a single safety chain, the process is repeated on the opposite side. (If using a trailer mounted safety chain adjustment box 20a and vehicle mounted safety chain adjustment box 20b mounted on only one side, the process is completed). In the preferred embodiment, however, a single safety chain of sufficient length is used and the process continues by then threading the safety chain through the trailer mounted safety chain adjustment box 20a or vehicle mounted safety chain adjustment box 20b on the opposite side of the same unit (trailer or vehicle) as just previously secured. Safety chain 36 is then secured into position as previously described and safety chain 36 second end 60 is then secured in the final trailer mounted safety chain adjustment box 20a and vehicle mounted safety chain adjustment box 20b and secured as previously described. Thus, the ability to adjust the length of safety chain 36 is found in three locations: between the vehicle and trailer in two spots and on either the vehicle or trailer in one spot.

It is to be understood, however, that even though numerous characteristics and advantages of the preferred and alternative embodiments have been set forth in the foregoing description, together with details of the structure and function of the embodiments, the disclosure is illustrative only.

Such variations should be considered to be within the scope and spirit of the invention which is meant to cover an anodizing system for simultaneously coating the exterior and interior of parts having an interior portion. Changes may be made in detail, especially in matters of shape, size and arrangement of parts within the principles of the invention to the full extent indicated by the broad general meaning of the terms in which the appended claims are expressed.

I claim:

1. A safety chain assembly comprising:
    a safety chain having a first free end and a second free end;
    at least one trailer mounted safety chain adjustment box for mounting to a trailer frame further comprising a slot for accepting the safety chain first free end and adjusting its length;
    at least one vehicle mounted safety chain adjustment box for mounting to a vehicle further comprising a slot for accepting the safety chain second free end and adjusting its length, and further including retention rod holes; and,
    a retention rod.

2. The safety chain assembly of claim 1 wherein the at least one trailer mounted safety chain adjustment box has a shape selected from square, rectangular, generally half-moon round, generally half oval, and generally v-shaped.

3. The safety chain assembly of claim 1 wherein the at least one vehicle mounted safety chain adjustment box has a shape selected from square, rectangular, generally half-moon round, generally half oval, and generally v-shaped.

4. The safety chain assembly of claim 1 wherein the at least one trailer mounted safety chain adjustment box further comprises an outer wall opposite the trailer frame, a first side wall, a second side wall, an at least partially open top, and an at least partially open bottom adapted to receive said safety chain therethrough, the outer wall further including the slot for accepting the safety chain first free end.

5. The safety chain assembly of claim 4 wherein the at least one trailer mounted safety chain adjustment box further comprises a trailer-side wall.

6. The at least one trailer mounted safety chain adjustment box of claim 4 wherein the bottom is closed.

7. The safety chain assembly of claim 1 wherein the at least one vehicle mounted safety chain adjustment box, the at least one vehicle mounted safety box chain adjustment further comprises an outer wall opposite the vehicle-side wall, a first side wall, a second side wall, an at least partially open top, and an at least partially open bottom, the outer wall further including the means for accepting the safety chain second free end.

8. The safety chain assembly of claim 7 wherein the at least one vehicle mounted safety chain adjustment box further comprises a vehicle-side wall.

9. The at least one vehicle mounted safety box of claim 7 wherein the at least one vehicle mounted safety chain adjustment box bottom is closed.

10. The safety chain assembly of claim 1 wherein the at least one trailer mounted safety chain adjustment box slot is vertical and open to the top.

11. The safety chain assembly of claim 1 wherein the at least one trailer mounted safety chain adjustment box slot is contained in the outer wall and sized to receive the safety chain first free end, which free end can then be secured.

12. The safety chain assembly of claim 1 wherein the at least one vehicle mounted safety chain adjustment box slot is vertical and open to the top.

13. The safety chain assembly of claim 1 wherein the at least one vehicle mounted safety chain adjustment box slot is contained in the outer wall and sized to receive the safety chain first free end, which free end can then be secured.

* * * * *